United States Patent
Tian et al.

(10) Patent No.: US 8,628,193 B2
(45) Date of Patent: Jan. 14, 2014

(54) AUTOMATIC ACCOMMODATIVE SPECTACLES USING A SCENE ANALYZER AND FOCUSING ELEMENTS

(76) Inventors: Yibin Tian, Menlo Park, CA (US); Thang Duong, San Jose, CA (US)

(*) Notice: Subject to any disclaimer, the term of this patent is extended or adjusted under 35 U.S.C. 154(b) by 388 days.

(21) Appl. No.: 12/951,002

(22) Filed: Nov. 20, 2010

(65) Prior Publication Data
US 2012/0127422 A1    May 24, 2012

(51) Int. Cl.
G02C 1/00 (2006.01)
G02C 11/00 (2006.01)
G02C 7/06 (2006.01)
G02B 15/14 (2006.01)

(52) U.S. Cl.
CPC ............... G02C 11/10 (2013.01); G02C 7/061 (2013.01); G02B 15/14 (2013.01)
USPC ............................. 351/158; 351/41; 359/354

(58) Field of Classification Search
CPC ......... G02C 11/10; G02C 7/061; G02B 15/14
USPC ............... 351/41, 44, 158, 209, 210; 359/354
See application file for complete search history.

(56) References Cited

U.S. PATENT DOCUMENTS

| | | |
|---|---|---|
| 3,712,716 A | 1/1973 | Cornsweet et al. |
| 3,856,381 A | 12/1974 | Hedman, Jr. et al. |
| 3,877,798 A | 4/1975 | Tolar et al. |
| 3,975,093 A | 8/1976 | Upton |
| 4,287,410 A | 9/1981 | Crane et al. |
| 4,300,818 A * | 11/1981 | Schachar .................. 351/158 |
| 4,472,036 A | 9/1984 | Kitani |
| 4,572,616 A | 2/1986 | Kowel et al. |
| 4,929,069 A | 5/1990 | Shibayama |
| 4,988,183 A | 1/1991 | Kasahara et al. |
| 4,993,825 A | 2/1991 | Abe et al. |
| 5,231,674 A | 7/1993 | Cleveland et al. |
| 5,430,505 A | 7/1995 | Katz |
| 5,861,936 A * | 1/1999 | Sorensen .................. 351/200 |
| 5,956,183 A | 9/1999 | Epstein et al. |
| 5,991,096 A | 11/1999 | Estelle |
| 6,027,216 A | 2/2000 | Guyton et al. |
| 6,283,954 B1 | 9/2001 | Yee |
| 6,517,203 B1 | 2/2003 | Blum et al. |

(Continued)

OTHER PUBLICATIONS

Brown MZ et al., Advances in Computational Stereo, IEEE Transactions on Pattern Analysis and Machine Intelligence, vol. 25, pp. 993-1008, Aug. 2003.

(Continued)

*Primary Examiner* — Huy K Mai
(74) *Attorney, Agent, or Firm* — Chen Yoshimura LLP

(57) ABSTRACT

A pair of spectacles that can automatically change its power so that a fixation region of interest (ROI) of the user is always in focus. The automatic accommodative spectacle device includes focusing elements, scene sensors, scene analyzer, focus engine, focusing element controller, and power supply. The scene analyzer determines the fixation ROI in the scene by analyzing the scene images. The fixation ROI is used to determine powers for the focusing elements in order to bring the fixation ROI into focus. The focusing element controller carries out the needed optical power adjustment to apply to the focusing elements. Optional light sources may be provided to the scene sensors. Additional optional eye sensor(s), eye light source and line of sight detector can be used to help the scene analyzer extract the fixation ROI.

25 Claims, 3 Drawing Sheets

(56) References Cited

U.S. PATENT DOCUMENTS

| | | |
|---|---|---|
| 6,616,691 B1 | 9/2003 | Tran |
| 7,142,369 B2 | 11/2006 | Wu et al. |
| 7,321,469 B2 | 1/2008 | Ohno |
| 7,382,545 B2 | 6/2008 | Jung et al. |
| 7,466,493 B2 | 12/2008 | Kim et al. |
| 7,522,256 B2 | 4/2009 | Horiuchi et al. |
| 7,548,380 B2 | 6/2009 | Jeong |
| 7,553,019 B2 | 6/2009 | Kuiper et al. |
| 7,672,059 B2 | 3/2010 | Batchko et al. |
| 7,701,642 B2 | 4/2010 | Obinata |
| 2006/0089712 A1 | 4/2006 | Malecaze |
| 2009/0262298 A1 | 10/2009 | Chen |
| 2010/0053543 A1 | 3/2010 | Silver et al. |

OTHER PUBLICATIONS

Grossmann P, Depth from Focus, Pattern Recognition Letters, vol. 5, pp. 63-69, Jan. 1987.

Subbarao M et al., Depth from Defocus: a Spatial Domain Approach, International Journal of Computer Vision, vol. 13, pp. 271-294, 1994.

Gokturk SB et al., A Time-Of-Flight Depth Sensor—System Description, Issues and Solutions, 2004 Conference on Computer Vision and Pattern Recognition Workshop, pp. 35.

Valkenburg RJ et al., Accurate 3D measurement using a structured light system, Image and Vision Computing, vol. 16, pp. 99-110, 1998.

Kuratli C et al., A CMOS ultrasound range-finder microsystem, IEEE Journal of Solid-State Circuits, vol. 35, pp. 2005-2017, Dec. 2000.

Shinohara S et al., Compact and high-precision range finder with wide dynamic range and its application, IEEE Transactions on Instrumentation and Measurement, vol. 41, No. 1, pp. 40-44, Feb. 1992.

Itti L et al., A model of saliency-based visual attention for rapid scene analysis, IEEE Transactions on Pattern Analysis and Machine Intelligence, vol. 20, pp. 1254-1259, Nov. 1998.

Walker et al., Locating Salient Object Features, British Machine Vision Conference, pp. 557-566, unknown date.

\* cited by examiner

AUTOMATIC ACCOMMODATIVE SPECTACLES USING A SCENE ANALYZER AND FOCUSING ELEMENTS

BACKGROUND OF THE INVENTION

1. Field of the Invention

This invention relates to spectacles. In particular, it relates to automatic accommodative spectacles that use a scene analyzer to determine a patient's region of interest (ROI or fixation ROI) in the scene of the field of view of the patient (user) and automatically adjust the optical power of focusing elements on the spectacles to help him/her remain focused on the fixation ROI.

2. Description of the Related Art

Spectacles and contact lenses are commonly used optical devices to correct refractive errors, such as myopia (nearsightedness) and hyperopia (farsightedness). Most prescribed spectacles and contact lenses are unifocal that have one fixed optical power. Unfortunately, patients' refractive errors can change overtime and unifocal correction devices cannot adapt to such changes. In addition, patients with presbyopia, that is, people whose eyes cannot adequately focus on nearby objects due to aging, need different optical powers to clearly see targets at various distances. In recent years, accommodative intraocular lenses (A-IOL) have been reported, such as U.S. Pat. No. 6,616,691, US patent application 2006/0089712. But A-IOL can only be implanted in patients' eyes after cataract surgeries. A number of multifocal spectacles and contact lenses have been proposed and/or produced; they can provide either a few discrete number of optical powers or continuous varying optical powers (U.S. Pat. Nos. 3,877,798, 3,975,093 and 4,472,036). They usually require the patients to use different regions of the devices or look at targets in specific fashions, putting significant constraints on how patients look at their targets of interest.

A variable focusing element is an optical device that can vary its focusing capability. There are a number of methods to achieve variable focus. Some variable focus lenses have been proposed and/or produced to make spectacles (U.S. Pat. Nos. 5,956,183, 6,517,203, 7,553,019, and US patent application 2010/0053543). However, in these proposals, how to determine the needed optical power of the lenses are not specified. The amount of optical power adjustment is usually based on the feedback from visual perception. Such devices can be useful for patients in certain cases where the viewing targets are stationary or changing infrequently, but are not practical for general usage.

SUMMARY OF THE INVENTION

For patients who cannot dynamically change their lens power to focus on the fixation ROI, a pair of spectacles that can automatically change its power so that the fixation ROI is always in focus is needed.

Accordingly, the present invention is directed to a spectacle device that substantially obviates one or more of the problems due to limitations and disadvantages of the related art.

An object of the present invention is to provide a spectacle device that automatically accommodates so that the fixation ROI is always in focus.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an automatic accommodative spectacle device for use by a patient (user), which includes: a spectacle frame; one or more sensors that capture the scene in the user's field of view; a scene analyzer that analyzes the scene signals captured by the sensors to determine the 3-dimensional location of the ROI; a focus engine for determining optimum powers for the focusing elements based on the location of the ROI; and a focusing elements controller connected to the focusing elements and the focus engine for controlling optical powers of the focusing elements based on the optimum powers for the focusing elements determined by the focus engine.

Multiple types of sensors, such as CCD/CMOS grayscale or color image sensors, depth image sensors based on time-of-flight or structured light technology, and so on, can be used to provide scene signals to the scene analyzer. How the scene analyzer works depends on what type of signals/images are generated by the sensors. But its fundamental goal is to find the ROI in the scene and compute the distances between the user's eyes and the ROI. The later may either be directly supplied by the sensors, or computed in the scene analyzer. One or more additional optional sensor can be used to monitor one eye of the user and a optional line of sight detector can determine its line of sight, which in turn is used by the scene analyzer to better locate the patient's fixation ROI.

The device may also include an optional light source or flash for the scene sensor(s) and/or the optional eye sensor, which may be turned on or off as needed.

The automatic accommodative spectacle device further includes a power supply for supplying power to the focusing elements, the scene sensor(s), the scene analyzer, the optional eye sensor and the line of sight detector, the focus engine and the focusing elements controller.

In another aspect, the present invention provides a method for focusing an automatic accommodative spectacle device for use by a user, which includes: capturing signals/images of the scene in the user's field of view by one or more sensors; determining a ROI of the user and its distance from the user's eyes by a scene analyzer; determining optimum powers for the focusing elements by the focus engine based on the detected ROI; and controlling optical powers of one or more focusing elements of the automatic accommodative spectacle device by a focusing elements controller based on the optimum powers for the focusing elements determined by the focus engine.

It is to be understood that both the foregoing general description and the following detailed description are exemplary and explanatory and are intended to provide further explanation of the invention as claimed.

DETAILED DESCRIPTION OF THE PREFERRED EMBODIMENTS

A co-pending U.S. patent application by the same inventors, U.S. patent application Ser. No. 12/916,508, filed Oct. 30, 2010, is herein incorporated by reference in its entirety. This co-pending application describes automatic accommodative spectacles that use sensors to monitor the patient's lines of sight to determine his/her fixation ROI. In real-time, the associated necessary optical power adjustments are estimated, and focusing elements are adjusted accordingly. This method is adequate for the majority of the patients whose two eyes can align properly and the lines of sight of both eyes can be monitored. However, for patients whose two eyes cannot properly align with each other due to strabismus or other ocular conditions, or patients whose two lines of sight cannot be detected properly at the same time, an alternative approach is needed.

Figure 1:
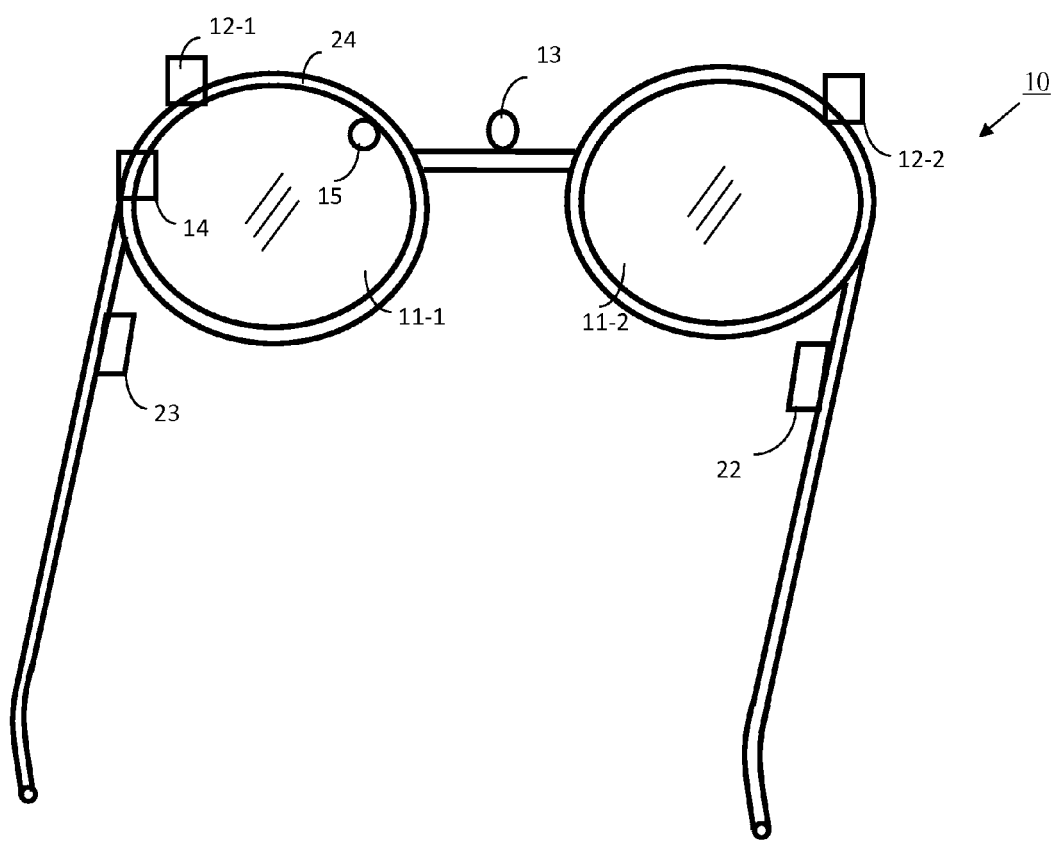
FIG. 1 schematically illustrates a pair of automatic accommodative spectacles according to an embodiment of the present invention.
Figure 2:
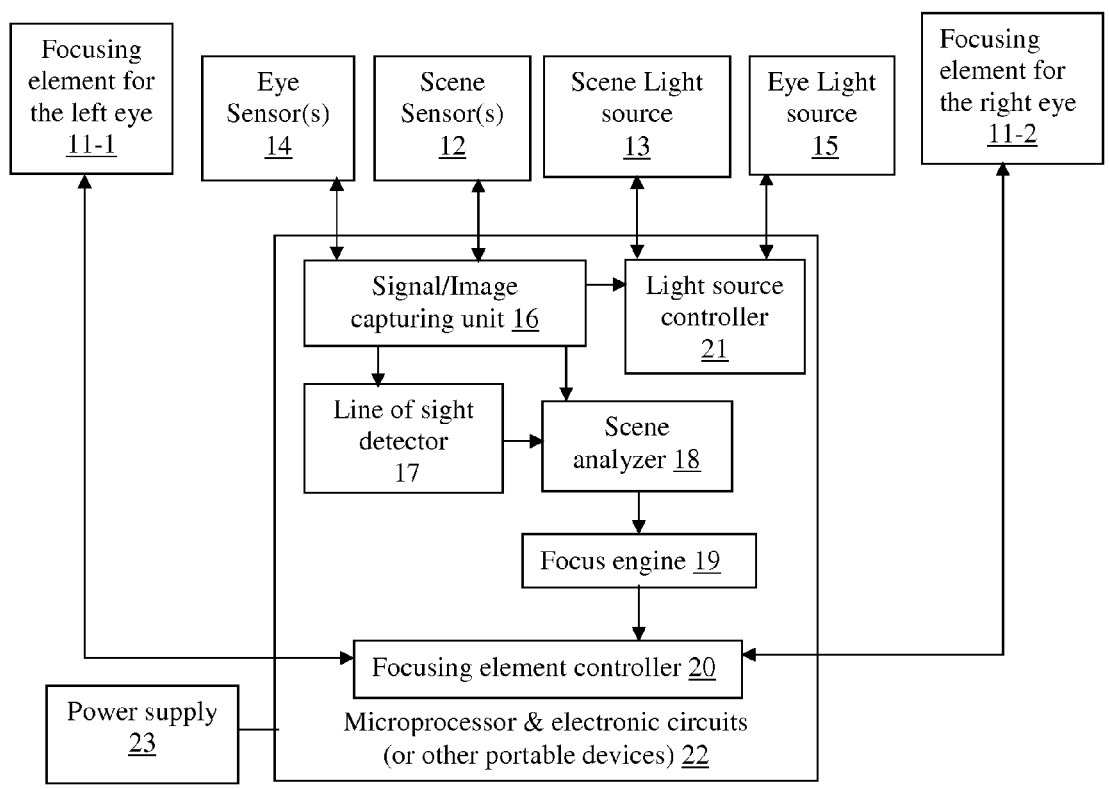
FIG. 2 is a block diagram illustrating components of the automatic accommodative spectacles according to an embodiment of the present invention.

The present disclosure describes a spectacle device that automatically focuses on the fixation ROI of the patient (user) using scene analyzing techniques. As shown in FIGS. 1 and 2, the spectacle device 10 includes left and right focusing elements 11-1 and 11-2, scene sensors 12-1 and 12-2 (collectively, 12), a signal or image capturing unit 16, a scene analyzer 18, a focus engine 19, a focusing element controller 20, and a power supply 23. Optionally, the spectacle device also includes an eye sensor 14, an eye light source 15, a line of sight detector 17, a scene light source or flash 13, and a light source controller 21.

As shown in FIG. 1, these various components are attached to a spectacle frame 24. The number and locations of various components shown in FIG. 1 are for illustration only. Actual implementation may vary.

The signal/image capturing unit 16, scene analyzer 18, focus engine 19, focusing element controller 20, optional line of sight detector 17, and optional light source controller 21 may be implemented in a control unit 22, which may include microprocessor(s) executing software programs, and/or electronic circuits such as ASIC, DSP and FPGA. The control unit 22 may be a dedicated unit mounted on the frame 24, or it may be located on a separate, dedicated portable device not mounted to the frame 24. Alternatively, the components 16, 17, 18, 19, 20, and 21 may be implemented as a part of another (non-dedicated) portable device, such as a PDA (personal digital assistant), a mobile phone, a music player, a GPS device, and so on. The components 16, 17, 18, 19, 20, and 21 may also be located in a distributed manner, i.e., some mounted on the frame 24 and some located on a separate portable device.

Figure 3:
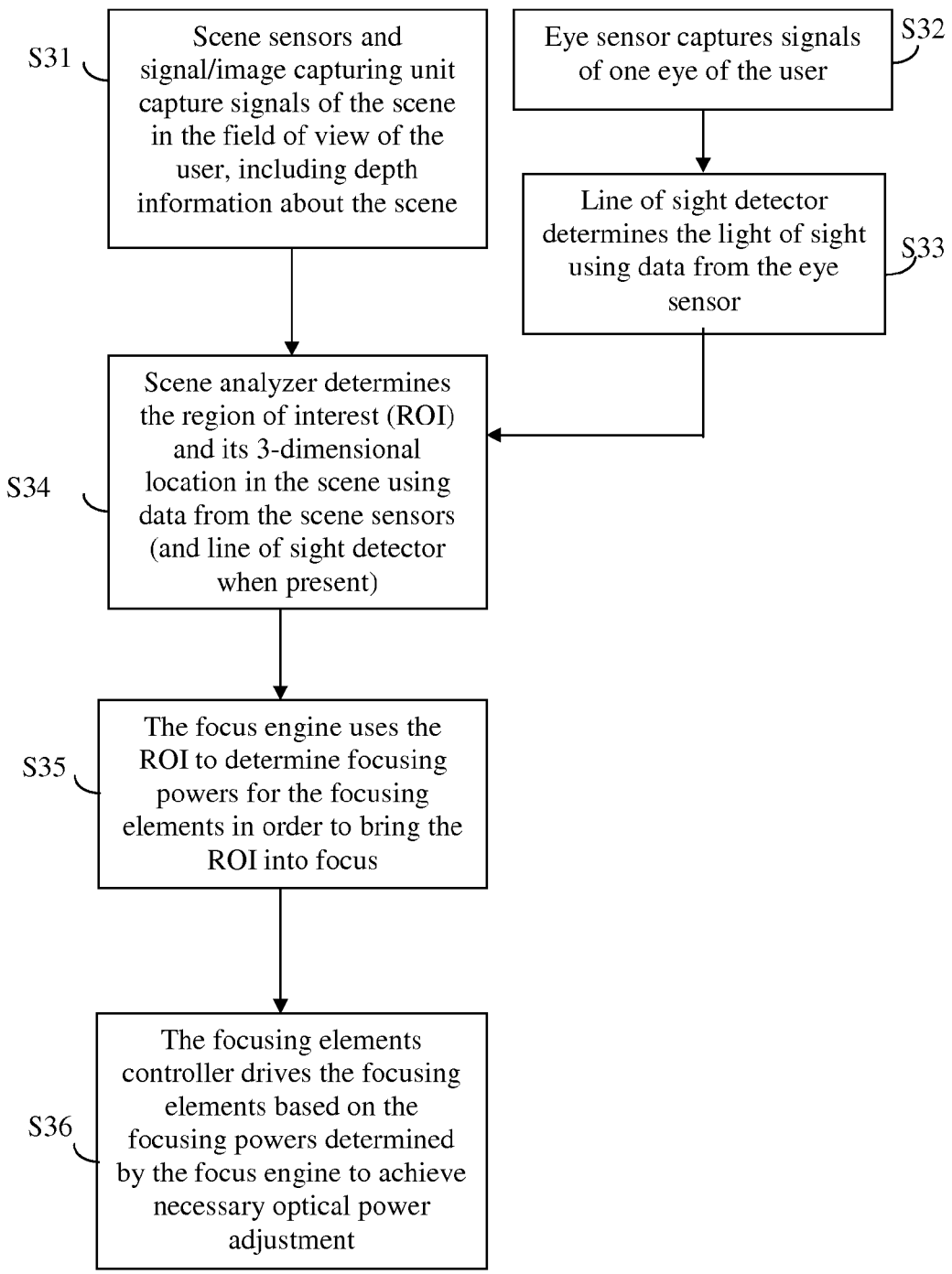
FIG. 3 is a flow chart showing the operation of the automatic accommodative spectacles according to an embodiment of the present invention.

The functions and operations of the various components are described with reference to FIG. 3.

The signal/image capturing unit 16 collaborates with the scene sensors 12-1 and 12-2 to capture signals about the scene in the user's field of view (with or without the light sources), including depth information regarding objects in the scene (step S31). The scene sensors 12 and the signal/image capturing unit 16 may implement various technologies for capturing signals about the scene, as will be described in more detail later. Depending on the scene capturing technologies being implemented, the signal/image capturing unit 16 may perform a control function to control the scene sensors 12, and/or a data processing function to process the data generated by the scene sensors 12. The signal/image capturing unit 16 also collaborates with the light source controller 21 to control the optional scene light source or flash 13 if it is required or desired for the scene capturing technology being implemented.

The optional eye sensor 14 captures signals about one eye of the user (with or without the eye light source 15) (step S32). For example, the sensor may be a conventional grayscale or color image sensor, i.e., the captured signals are one or more intensity or color images of the eye. The optional eye light source 15 shines light on the eye and improve signal to noise ratio of the signals/images measured by the sensors. The light source controller 21 controls the optional eye light source 15. Preferably, the eye light sources 15 are turned on and off to control power usage and improve sensor signal-to-noise ratio. For example, the eye light sources 15 may be turned on when ambient light level is low and off when it is high, and it may be turned off when the battery is low. There may be zero or more light sources 15. The optional line of sight detector 17 determine the line of sight using the signals from the optional eye sensor 14 (S33), as described in the above-referenced co-pending application Ser. No. 12/916,508. The optional line of sight detector 17 is required when the optional eye sensor 14 is present.

When the eye sensor 14 is present, the scene sensors 12 and the eye sensor 14 are preferably coordinated such that they are synchronized with each other to facilitate the subsequent step of determining the ROI. The signal/image capturing unit 16, which is connected to both the eye sensor 14 and the scene sensors 12, controls both of them and performs the coordination function. In addition, the signal/image capturing unit 16 may perform certain signal processing for the signals captured by both the scene sensors 12 and the eye sensor 14, such as de-noising, filtering or segmentation.

The scene analyzer 18 determines the user's ROI and its 3-dimensional location using scene data from the sensors 12-1 and 12-2 and the signal/image capturing unit 16, as well as line of sight data from the line of sight detector 17 when it is present (step S34). The focus engine 19 uses the information of the fixation ROI from the scene analyzer 18 to determine focusing powers for the focusing elements in order to bring the fixation ROI into focus for the user (step S35). Based on the focusing powers determined by the focus engine 19, the controller 20 drives the focusing elements 11-1 and 11-2 to achieve necessary optical power adjustment (step S36).

If optional eye sensor 14 and line of sight detector 17 are not present, S31, S34, S35, S36 are repeated, preferably repeated constantly, unless instructed not to do so. Otherwise, Steps S31 to S36 are all repeated, preferably repeated constantly, unless instructed not to do so.

In step S31, the signal/image capturing unit 16 and the scene sensors 12-1 and 12-2 may use various appropriate technologies to capture signals of the scene including depth information, some of which are described below.

The first type of technologies involves image sensors that provide intensity and/or color images of the scene. There are several approaches to obtain depth information from images obtained by image sensors. The first approach is stereo depth recovery, which requires at least two scene sensors. Some of the algorithms for this approach are summarized in Brown M Z et al., Advances in Computational Stereo, IEEE Transactions on Pattern Analysis and Machine Intelligence, Vol. 25, pp 993-1008. The second approach is depth from focus/defocus, which requires one scene sensor, but more than one can be used as well. Examples of this approach are described in Grossmann P, Depth from Focus, Pattern Recognition Letters, Vol. 5, pp 63-69 and Subbarao M et al., Depth from Defocus: a Spatial Domain Approach, International Journal of Computer Vision, Vo. 13, pp 271-294. Other applicable depth recovery methods can also be used.

For this type of image sensors, scene light source or flash 13 is optional. The optional scene light sources or flash 13 shines light on the scene and improve signal to noise ratio of the signals/images measured by the sensors. Preferably, the scene light sources 13 are turned on and off to control power usage and improve sensor signal-to-noise ratio. For example, the scene light sources 13 may be turned on when ambient light level is low and off when it is high, and it may be turned off when the batter is low. There may be zero or more scene light sources 13.

The second type of technologies involves image sensors that provide depth and/or brightness images of the scene, such as array imagers based on time-of-flight, for example that described in Gokturk S B et al., A Time-Of-Flight Depth Sensor—System Description, Issues and Solutions, 2004 Conference on Computer Vision and Pattern Recognition Workshop, pp 35; array imagers based on structured light, such as that described by Valkenburg R J et al., Accurate 3D measurement using a structured light system, Image and Vision Computing, Vol. 16, pp 99-110; or other imagers. For this type of image sensors, scene light source 13 is mandatory.

The sensors used in the second type of technologies can be combined with one sensor used in the first type of technologies to obtain additional color or brightness information of the scene. This is particularly helpful when the second type of sensors does not provide brightness images. Even when the second type of sensors does provide brightness images, the mechanism of forming these images is different for the first type of sensors. Thus, the two types of sensors can be complementary in terms of the signals/images provided.

The third type of technologies involves range finders that provide depth and/or brightness information of one or more points or lines each time. When combined with some scanning mechanism, this type of sensors can provide depth and/ or brightness images as well. Such range finders include, for example, ultrasound range finder, such as that described in Kuratli C et al., A CMOS ultrasound range-finder microsystem, IEEE Journal of Solid-State Circuits, Vol. 35, pp 2005-2017, laser scanning range finder, such as that described by Shinohara S et al, Compact and high-precision range finder with wide dynamic range and its application, IEEE Transactions on Instrumentation and Measurement, Vol. 41, pp 40-44. Other range-finders may also be used.

One skilled in the art will be able to implement the scene sensors 12 and the signal/image capturing unit 16 based on the teaching of above cited references, or use other devices and methods currently known or will be developed in the future. The scope of this invention encompasses any suitable implementation of the scene sensors 12 and the signal/image capturing unit 16.

In step S34, various methods can be used to determine the ROI and its distance from the user's eyes. If optional eye sensor 14 and line of sight detector 17 are present, the line of sight outcome from the line of sight detector 17 is used to help the scene analyzer 18 extract the user's ROI.

For example, suppose the line of sight is represented as a line in 3-dimensional space parameterized with respect to t by $$p(t) = v \cdot t + p_0 = \begin{bmatrix} v_1 \\ v_2 \\ v_3 \end{bmatrix} t + \begin{bmatrix} p_1 \\ p_2 \\ p_3 \end{bmatrix}$$

and the 3-dimensional scene depth can be represented as a surface parameterized with respect to x and y as follows $$z(x, y) = \begin{bmatrix} x \\ y \\ f(x, y) \end{bmatrix}$$

where axis 1 and 2 span the coronal plane and axis 3 is orthogonal to it. In this framework, the user's ROI is the intersection of the surface z(x, y) and line p(t).

Other appropriate methods can be used to extract the user's ROI from the scene using the line of sight. In another more sophisticated embodiment, two optional eye sensors 14 can be used, one for each eye, to detect the lines of sight of both eyes for patients whose eyes can align normally and whose lines of sight can be detected properly, to further facilitate the localization of ROI. The above-referenced co-pending application Ser. No. 12/916,508 describes using two eye sensors to detect the lines of sight of both eyes.

If the optional eye sensor 14 and line of sight detector 17 are not present, different methods can be used to compute the user's fixation ROI. For example, one method to obtain the user's fixation ROI is to instruct the user to look at his/her ROI in the straight forward direction. As a result, the ROI falls in a fixed portion of the user's field of view, so the scene analyzer 18 can determine the fixation ROI by extracting a small window in a the fixed region of the scene images.

Alternatively, the ROI can be obtained without any constraints on how the user looks at the scene. One method is to analyze the salient features in the scene that are more likely to be the user's fixation ROI. Salient feature, in the vision research, refer to features in an image that are most likely to attract the attention of the viewer. Thus, salient features are more likely to be the ROI. There are various ways to determine salient features, some examples of which are described in Itti L et al, A model of saliency-based visual attention for rapid scene analysis, IEEE Transactions on Pattern Analysis and Machine Intelligence, Vol. 20, pp 1254-1259.

Another method is to use heuristic reasoning. Unlike in salient feature analyses, heuristic reasoning involves making assumptions regarding viewer's intentions. For example, for looking at nearby objects, users are usually interested in objects such as books, newspapers, or TV, which contain significant amount detailed visual content, such as text. Thus, the ROI will usually be an area that contains such objects. These assumptions of ROI characteristics can be incorporated into the scene analyzer 18 to facilitate ROI extraction. Once the ROI is determined, the distance from the ROI to the user's eyes can be calculated from the depth information about the scene.

If there are more than one potential ROI as determined by the above methods and they have different depths, the final ROI depth may be calculated using the one potential ROI that occupies the largest area. Alternatively, the final ROI depth may be calculated as a weighted average depth of all potential ROIs. Other methods can be used as well.

The scene analyzer 18 can combine depth recovery (when scene depth is not provided by scene sensors 12) and ROI extraction in order to reduce computation requirements. For example, if the line of sight for a single eye is available from the line of sight detector 17, then depth detection only needs to be done along this line. The ROI is the region around a point where the $3^{rd}$ coordinate of line of sight equals the scene depth. Other methods of combination can be used to reduce computational needs.

The scene sensors 12 and eye sensor 14 should be calibrated properly in order to utilize the described ROI extraction and its depth recovery, and line of sight detection. The proper calibration procedures depend on the types of sensors used.

The focusing elements 11-1 and 11-2 are optical devices that can vary their focusing power. They may be variable focus lenses or other focusing devices, such as phase plates. There are a number of known methods to achieve variable focus. One common method utilizes multiple-element composite lenses that can adjust the distance between two or more optical elements, as described in U.S. Pat. Nos. 4,929,069, 5,991,096, 7,321,469, 7,548,380, etc. A second method utilizes liquid crystal devices, the optical transmission properties of which can be controlled electrically, as described in U.S. Pat. Nos. 3,856,381, 4,572,616, 7,522,256, U.S. Patent Application Publication 20090262298, etc. A third method uses enclosed liquid, the surface curvature of which can be modified electrically or mechanically, as described in U.S. Pat. Nos. 7,142,369, 7,382,545, 7,466,493, 7,672,059, 7,701, 642, etc. One skilled in the art will be able to implement the focusing elements 11-1 and 11-2 and the focusing element controller 20 based on the teaching of these references, or use other devices and methods currently known or will be developed in the future. The scope of this invention encompasses any suitable implementation of the focusing elements 11-1 and 11-2 and the focusing element controller 20.

The focusing elements 11-1 and 11-2 can be controlled by any appropriate method. For example, the focusing elements may be controlled directly by electrical signals from the focusing element controller 20, or, alternatively, the focusing elements are controlled by motorized mechanical, solid state, or MEMS elements, which in turn are electrically controlled by focusing element controller 20. In both cases, the current status of the focusing elements may be reported to and used by the focusing element controller 20 to determine the proper control signals to be delivered.

A pair of focusing elements 11-1 and 11-2 are needed, one for the left eye, and the other for the right eye. In a preferred embodiment, the two focusing elements 11-1 and 11-2 are controlled independently to achieve different amount of optical power for the two eyes. Alternatively, they can also be adjusted in the same amount if desired. The focusing elements 11-1 and 11-2 may be enclosed directly within the spectacle frame 24, or have their own supporting structures that fit into the spectacle frame.

Once the ROI is determined, the focus engine determines the focusing powers (step S35) and the controller 20 adjusts focusing elements 11-1 and 11-2 (step S36) so that the fixation ROI becomes clear for the user. One such method is by adjusting the dioptric power of the left and right focusing elements to $$D_{left} = \frac{1}{Z_{left}} + C_{left} \text{ and } D_{right} = \frac{1}{Z_{right}} + C_{right},$$

respectively. Here, $C_{left}$ and $C_{right}$ are correction powers required so that the left and right eyes focus at infinity, and $Z_{left}$ and $Z_{right}$ the distances between the ROI center and the user's left and right eyes respectively. A look-up-table (LUT) can be used to relate the ROI to the appropriate optical powers of the two focusing elements. Other optical power adjustment schemes can be utilized as well.

Preferably, the desired optical power adjustment resolution is higher for near-distance fixation ROI, and lower for far-distance fixation ROI. The optical power adjustment resolution transition can be nonlinear from near-distance to far-distance. Approximations can be utilized to reduce the computation and/or the size of look-up-table as described above.

The various components of the spectacle device are powered by the power source 23. Power is needed for the microprocessor & electronic circuits, the focusing elements and their controller, the sensors, and the optional light sources and their controller. The power supply 23 may be conventional batteries (rechargeable or non-rechargeable), solar energy harvesting device(s), other portable devices, or a combination of such devices. The power supply 23 may be mounted on the frame 24 or located on a separate portable device. The power supply 23 may be the power supply of a non-dedicated portable device such as a PDA, mobile phone, etc. The power supply 23 may also be a converter directly connecting to an electrical outlet.

It will be apparent to those skilled in the art that various modification and variations can be made in the automatic accommodative spectacle of the present invention without departing from the spirit or scope of the invention. Thus, it is intended that the present invention cover modifications and variations that come within the scope of the appended claims and their equivalents.

What is claimed is:

1. An automatic accommodative spectacle device for use by a user, comprising:
   a spectacle frame;
   one or more focusing elements mounted on the spectacle frame;
   a scene sensor system including one or more scene sensors for capturing signals of a scene in the user's field of view, including depth information regarding objects in the scene;
   a scene analyzer for determining a fixation region of interest of the user and a depth of the fixation region of interest based on the signals of the scene;
   a focus engine coupled to the scene analyzer for determining optimum powers for the focusing elements based on the depth of the fixation region of interest; and
   a focusing elements controller connected to the focusing elements and the focus engine for controlling optical powers of the focusing elements based on the optimum powers for the focusing elements determined by the focus engine.

2. The automatic accommodative spectacle device of claim 1, further comprising:
   one or more eye sensors located adjacent the focusing elements for capturing signals about an eye of the user; and
   a line of sight detector coupled to the one or more eye sensors for determining a line of sight for the eye of the user based on the signals captured by the one or more eye sensors,
   wherein the scene analyzer determines the fixation region of interest of the user based on a combination of the signals of the scene and the line of sight for the eye.

3. The automatic accommodative spectacle device of claim 2, further comprising one or more eye light sources for shining a light on the user's eye.

4. The automatic accommodative spectacle device of claim 3, further comprising one or more light source controllers for controlling the one or more eye light sources.

5. The automatic accommodative spectacle device of claim 2, comprising two eye sensors for capturing signals about two eyes of the user, wherein the line of sight detector determines two lines of sight of the two eyes based on the signals captured by the two eye sensors, and wherein the scene analyzer determines the fixation region of interest based on a combination of the signals of the scene and the two lines of sight of the two eyes.

6. The automatic accommodative spectacle device of claim 1, further comprising one or more scene light sources for shining a light on the scene in the user's field of view.

7. The automatic accommodative spectacle device of claim 6, further comprising one or more light source controllers for controlling the one or more scene light sources.

8. The automatic accommodative spectacle device of claim 1, further comprising a power supply for supplying power to the focusing elements, the scene sensors, the scene analyzer, the focus engine, and the focusing elements controller.

9. The automatic accommodative spectacle device of claim 1, wherein the signals of a scene includes scene images, and wherein the scene analyzer determines the fixation region of interest by extracting a small window in a fixed region of the scene images.

10. The automatic accommodative spectacle device of claim 1, wherein the signals of a scene includes scene images, and wherein the scene analyzer determines the fixation region of interest by analyzing salient features in the scene images.

11. The automatic accommodative spectacle device of claim 1, wherein the scene analyzer determines the fixation region of interest by heuristic reasoning based on assumptions of region of interest characteristics.

12. The automatic accommodative spectacle device of claim 1, wherein the scene analyzer, the focus engine, and the focusing element controller are implemented in a control unit, and wherein the control unit includes a microprocessor executing software programs, or electronic circuits.

13. The automatic accommodative spectacle device of claim 12, wherein the control unit is either a dedicated unit mounted on the spectacle frame, or located on a separate portable device.

14. The automatic accommodative spectacle device of claim 1, wherein the focusing elements are variable focus lenses or phase plates.

15. The automatic accommodative spectacle device of claim 1, wherein the scene sensor system captures the signals of the scene including the depth information by using stereo depth recovery, depth from focus/defocus, time-of-flight, structured light, or scanning range finders.

16. A method for focusing an automatic accommodative spectacle device for use by a user, comprising:
   capturing signals about a scene in a field of view of the user, including depth information regarding objects in the scene, by a scene sensor system including one or more scene sensors;
   determining a fixation region of interest of the user and a depth of the fixation region of interest by a scene analyzer based on the signals about the scene;
   determining optimum powers for focusing elements by a focus engine based on the depth of the fixation region of interest;
   controlling optical powers of one or more focusing elements of the automatic accommodative spectacle device by a focusing elements controller based on the optimum powers for the focusing elements determined by the focus engine.

17. The method of claim 16, wherein the step of capturing signals about the scene includes determining the depth information using stereo depth recovery, depth from focus/defocus, time-of-flight, structured light or scanning range finders.

18. The method of claim 16, further comprising:
   capturing signals about one or two eyes or the user by one or more eye sensors; and
   determining one or two lines of sight of the one or two eye of the user based on the signals about the one or two eyes,
   wherein the fixation region of interest is determined by the scene analyzer based on a combination of the signals about the scene and the one or two lines of sight of the one or two eyes.

19. The method of claim 18, further comprising:
   shining a light on the user's eyes using one or more eye light sources.

20. The method of claim 19, further comprising:
   controlling the one or more eye light sources by one or more light source controllers.

21. The method of claim 16, further comprising:
   shining a light on the scene in the user's field of view using one or more scene light sources or flashes.

22. The method of claim 21, further comprising:
   controlling the one or more scene light sources by one or more light source controllers.

23. The method of claim 16, wherein the signals of a scene includes scene images, and wherein the scene analyzer determines the fixation region of interest by extracting a fixed portion of the scene images.

24. The method of claim 16, wherein the signals of a scene includes scene images, and wherein the scene analyzer determines the fixation region of interest by analyzing salient features in the scene images.

25. The method of claim 16, wherein the scene analyzer determines the fixation region of interest by heuristic reasoning based on assumptions of region of interest characteristics.

* * * * *